Nov. 23, 1937.  C. E. HILLERY-COLLINGS  2,100,000
CINEMATOGRAPHIC CAMERA AND PROJECTOR
Filed Nov. 16, 1935
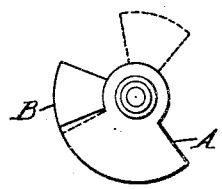
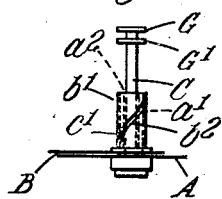
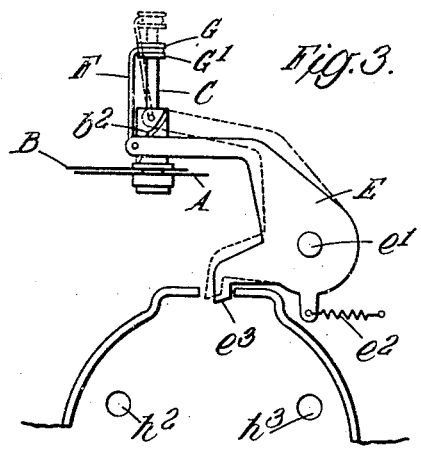
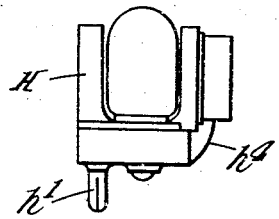
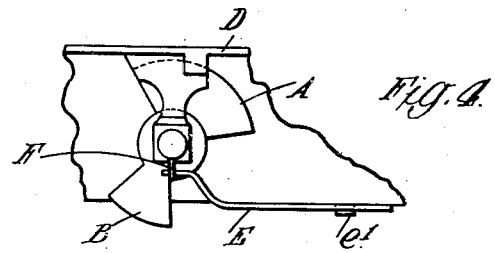
Inventor
Charles Edward Hillery-Collings
By Haseltine, Lake & Co.
Attorneys Patented Nov. 23, 1937

2,100,000

UNITED STATES PATENT OFFICE

2,100,000
CINEMATOGRAPHIC CAMERA AND PROJECTOR

Charles Edward Hillery-Collings, Mitcham, England

Application November 16, 1935, Serial No. 50,069
In Great Britain November 16, 1934

2 Claims. (Cl. 88—19.3)

This invention relates to cinematographic cameras and projectors, that is, to instruments capable of use either for photography or projection, of the kind in which a rotary shutter is used to control the passage of light through the lens. When such an instrument is to be used as a projector, it is desirable, in order to eliminate flickering, that the shutter should comprise two wings or closed segments with open spaces between them, so that each picture is shown twice in a revolution of the shutter, with dark intervals between the illuminations; but when used as a camera, a single exposure is desired.

The chief object of the invention is to provide the alternatives of a single bladed shutter and a double bladed shutter, the change from one position to the other being effected by the performance of some essential action in placing the instrument in operation as a camera or as a projector. This action may be the insertion or detachment of a lamp housing or a film magazine, or may be the raising or uncovering of a view finder. It may also be desired to effect the change by external means separately provided for that purpose.

According to the invention the rotary shutter includes one wing or segment permanently in position on a rotary member, and a second wing or segment pivoted about the centre of the shutter and adapted to be rocked relatively to the said first named segment between a position in which it overlaps the said first named segment, and a position in which it is spaced therefrom. These two relatively movable members of the shutter may be for example carried respectively on inner and outer tubes or sleeves mounted freely on a rod, one sleeve being driven directly by suitable gearing to synchronize with the film traversing mechanism and transmitting rotary movement to the shutter, one of the sleeves having a straight longitudinal slot and the other sleeve having a helical or inclined slot therein, and a pin on the rod passing through both the slots, so that by longitudinal movement of the rod a limited angular movement is imparted to the sleeve which is not directly driven, relatively to the driven sleeve. Relative movement is given to the sleeves by any suitable mechanism which may be operated by an external finger piece, but is preferably operated by the insertion of the lamp housing for projection, or by the insertion of the film charger or the actuation of the view finder for photographing. For example, a lever for moving one of the sleeves may be moved in one direction by a cam or protuberance on one of such detachable parts, and in the opposite direction by a spring.

In order that the said invention may be clearly understood and readily carried into effect, the same will now be further described with reference to the accompanying drawing illustrating an exemplification of the invention.

Figure 1 is a rear elevation of the shutter in a position in which the movable wing slightly overlaps the relatively fixed wing, the dotted lines indicating another position of the movable wing.

Figure 2 is an elevational plan view of the rod, sleeves and wings.

Figure 3 is a plan of mechanism for actuating the rod.

Figure 4 is a front elevation of the wings and the operating lever.

Figure 5 is a side elevation of a lamp housing by the insertion of which into the camera the said lever may be actuated.

A indicates the main portion of the shutter secured on a sleeve $a^1$ in which is a straight longitudinal slot $a^2$. B indicates the smaller portion of the shutter, secured on a sleeve $b^1$ in which is a helical slot $b^2$. C indicates the rod, on which is a pin $c^1$ passing through both slots $a^2$ and $b^2$. In the body D of the camera a lever E is pivoted at $e^1$, and a spring $e^2$ anchored to the body D tends to hold the lever E in the position shown in full lines in Figure 3, in which position the wire F on the lever E engaging a neck between two collars G, $G^1$ on the rod C holds the rod back so that the pin $c^1$ is close to the wings A, B, and the wings are in the position shown in full lines in Figure 1. When the camera is intended to be used for projection, the lamp housing H, comprising a condenser is inserted, two pins $h^1$ on the housing entering holes $h^2$, $h^3$ in the camera body D, and an inclined engaging surface $h^4$ on the front of the housing pushes forward the trigger $e^3$ on the lever E and rocks the said lever into the position seen in dotted lines in Figure 3, causing the wire F to draw forward the rod C and take the pin $c^1$ to the other end of the helical slot $b^2$, the sleeve $b^1$ receiving thereby a movement of rotation which swings the wing B into the position seen in dotted lines in Figure 1, that is, at 180° from the radial centre line of the wing A. The sleeve $a^1$ can be rotated in any known or suitable manner, for example by means including a toothed pinion on the said sleeve behind the shutter.

What I claim and desire to secure by Letters Patent of the United States is:—

1. A cinematographic instrument capable of use as a camera and as a projector, having a rotary shutter comprising two members mounted on concentric sleeves and normally overlapping each other but adapted to be spaced apart by a movement of relative rotation of said sleeves, means to effect such relative rotation including a pivoted lever, a detachable lamp housing provided with means to actuate said lever on the insertion of said housing into operative position in the instrument, cooperating means on said lamp housing and said instrument serving to position said housing in said instrument, and means to return the shutter members to their normal positions upon the withdrawal of said housing.

2. A cinematographic instrument capable of use as a camera and as a projector, a casing, a rod longitudinally movable in said casing, a sleeve rotatably mounted on said rod provided with a longitudinal slot and carrying a segmental shutter member, a second sleeve concentric with said first named sleeve provided with a helical slot and carrying a second segmental shutter member of smaller size than said first named shutter member and normally overlapping said first named shutter member, a pin on said rod engaging the slots in both sleeves, a lever pivoted in said casing and operatively connected with said rod to effect the longitudinal movements of the latter, a lamp housing, cooperating means on said lamp housing and said casing serving to position said lamp housing in said casing, said lamp housing being provided with means effective when being so positioned to actuate said lever to press forward said rod in order to rotate said second sleeve so as to swing the shutter member on said second sleeve to a position diametrically opposite the shutter member on said first sleeve, and a spring attached to said lever and to said casing tending to return said lever, rod, and shutter members to their normal positions on removal of said lamp housing.

CHARLES EDWARD HILLERY-COLLINGS.